G. E. ELIA.
SUBMARINE MINE.
APPLICATION FILED APR. 19, 1916.
1,198,427.
Patented Sept. 19, 1916.
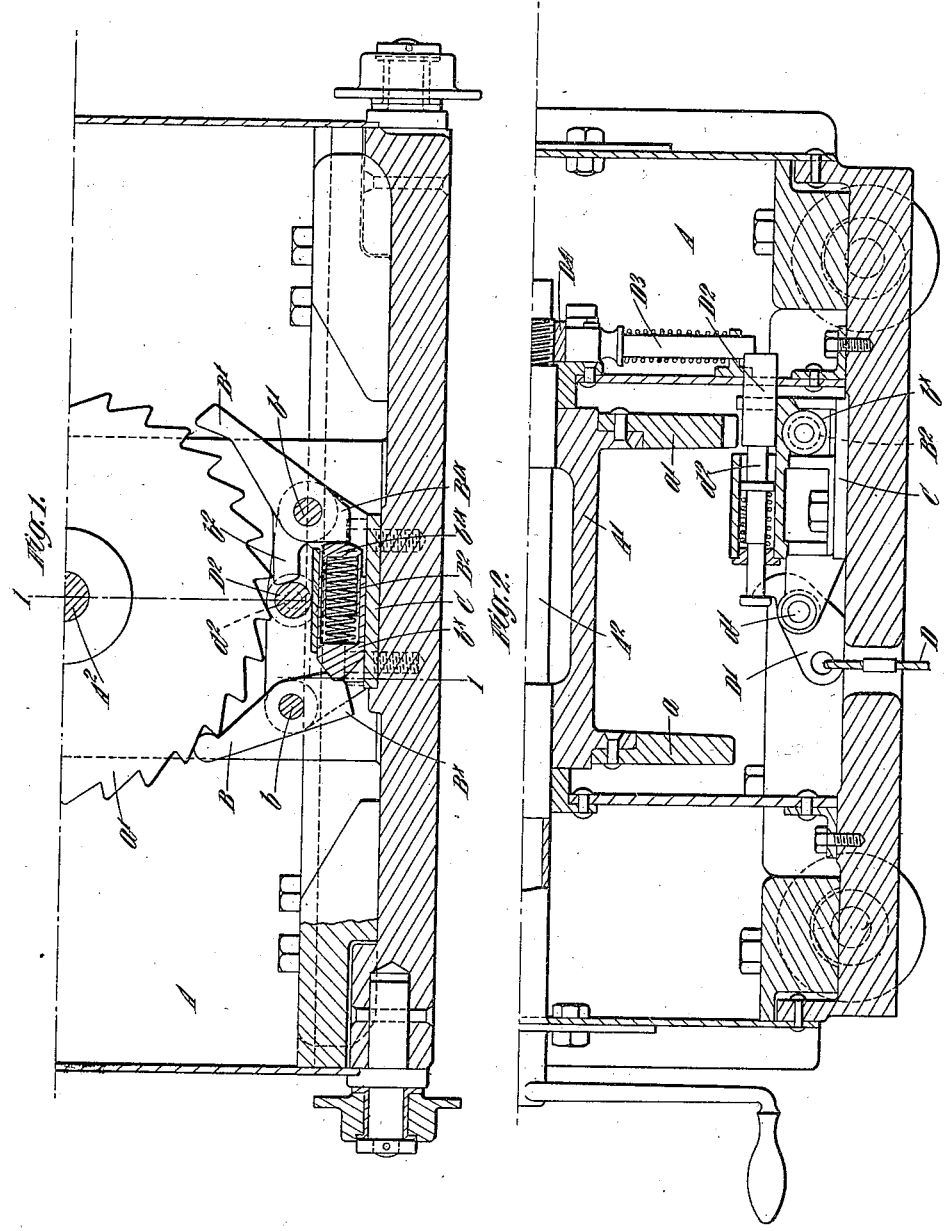
Inventor:
Giovanni E. Elia
By [signature]
Atty.

UNITED STATES PATENT OFFICE.

GIOVANNI EMANUELE ELIA, OF WESTMINSTER, LONDON, ENGLAND, ASSIGNOR TO VICKERS LIMITED, OF LONDON, ENGLAND.

SUBMARINE MINE.

1,198,427.

Specification of Letters Patent.  Patented Sept. 19, 1916.

Application filed April 19, 1916. Serial No. 92,270.

*To all whom it may concern:*

Be it known that I, GIOVANNI EMANUELE ELIA, a subject of the King of Italy, residing at Vickers House, Broadway, Westminster, in the county of London, England, have invented certain new and useful Improvements in or Relating to Submarine Mines, of which the following is a specification.

This invention relates to submarine mines in which the anchor carries a cable drum whose movement is controlled by a brake pawl and is arrested by a stop pawl which comes into operation when the plummet or sounding ball reaches the sea bed as is well understood.

According to this invention the brake and stop pawls are mounted upon a common bracket so that the pawls and bracket constitute a single unit which can be readily placed in position in the anchor without requiring the adjustments that are necessary when the pawls constitute two separate units; the improved arrangement is also less expensive to manufacture and is composed of a small number of parts. The two pawls are arranged at one side of the anchor and operate upon only one of the flanges of the cable drum so that only one of the flanges need be formed with ratchet teeth; the pawls are also preferably controlled by a single spring interposed between tail pieces on the said pawls.

In order that the said invention may be clearly understood and readily carried into effect, the same will now be described more fully with reference to the accompanying drawings, in which:—

Figure is a sectional end elevation showing the lower part of an anchor provided with the improvements, and Fig. 2 is a section taken approximately on the line 1, 1 of Fig. 1.

A is the anchor, and A' is the cable drum having two flanges $a$, $a'$ of which only the latter is provided with teeth.

B is the brake pawl and B' is the stop pawl. C is the bracket upon which these pawls are pivated at $b$ and $b'$ respectively. B$^x$, B'$^x$ are the tail pieces of the pawls and B$^2$ is the spring interposed between these tail pieces.

The bracket C is attached by bolts or otherwise to the anchor. The spring B$^2$ is carried by telescopic casings $b^x$, $b'^x$ arranged in a hole in the bracket C; the outer ends of these casings bear against the tail pieces B$^x$, B'$^x$.

The plummet or sounding ball (not shown) is connected by a line D (Fig. 2) to one arm of a lever D' pivoted at $d'$ to the aforesaid bracket C. The other arm of this lever operates upon a spring controlled rod D$^2$ which is slidably carried by the bracket C and is cut away or made of smaller diameter at $d^2$. The weight of the plummet or sounding ball during its descent in the water holds the parts in the position sl wn by Fig. 2 so that the stop pawl B' is prevented from engaging with the toothed flange $a'$ by reason of an arm $b^2$ on this pawl bearing against that portion of the rod D$^2$ which is of full diameter. When however the plummet or sounding ball reaches the sea bed its weight is taken off the lever D' and the spring of the rod D$^2$ moves the latter until its reduced portion $d^2$ comes opposite the arm $b^2$ of the pawl B', whereupon the latter is free to be moved by the spring B$^2$ into engagement with the teeth on the flange $a'$ to prevent further paying out of the anchor cable. The said movement of the rod D$^2$ can take place only after the cable drum A' has made a predetermined number of revolutions, owing to the fact that the said rod is at other times obstructed by a spring controlled plunger D$^3$ whose upward or liberating movement is prevented by a nut D$^4$ on the spindle A$^2$ of the drum; when however the latter has made a certain number of revolutions the nut D$^4$ moves clear of the plunger D$^3$, the latter is displaced by its spring out of the path of the rod D$^2$ and the latter can then move as aforesaid to liberate the pawl B' when the plummet or sounding ball reaches the sea bed.

What I claim and desire to secure by Letters Patent of the United States is:—

1. In a submarine mine anchor, the combination with the cable drum, of a brake pawl, a stop pawl and a bracket on which both said pawls are mounted to form a single unit.

2. In a submarine mine anchor, the combination with the cable drum, of a brake pawl, a stop pawl, and a controlling spring common to both pawls.

3. In a submarine mine anchor, the combination with the cable drum, of a brake pawl, a stop pawl, tail pieces on said pawls, and a spring interposed between said tail pieces.

4. In a submarine mine anchor, the combination with the cable drum, of a brake pawl, a stop pawl, a bracket on which both pawls are mounted, tail-pieces on said pawls, and a spring interposed between said tail-pieces.

5. In a submarine mine anchor, the combination with the cable drum, of a brake pawl, a stop pawl and a toothed flange of said drum with which flange both pawls engage.

6. In a submarine mine anchor, the combination with the cable drum and the stop pawl for engaging with said drum, of a sliding rod, means whereby the weight of a plummet or sounding ball holds said rod in a position to prevent the pawl from engaging with said drum, and means for moving said rod, when the plummet or sounding ball reaches the sea bed, into a position to permit the pawl to move into engagement with said drum.

7. In a submarine mine anchor, the combination with the cable drum and the stop pawl for engaging with said drum, of a notched sliding rod, means whereby the weight of a plummet or sounding ball holds said rod in a position to prevent the pawl from engaging with said drum, and means for moving said rod, when the plummet or sounding ball reaches the sea bed, into a position to bring the notch in said rod opposite the pawl.

GIOVANNI EMANUELE ELIA.